July 20, 1965 K. SCHWARZ 3,195,858
SHAFT SEAL
Filed Dec. 5, 1963 2 Sheets-Sheet 1

July 20, 1965     K. SCHWARZ     3,195,858
SHAFT SEAL

Filed Dec. 5, 1963     2 Sheets-Sheet 2

INVENTOR
KURT SCHWARZ
BY
ATTORNEY

United States Patent Office 3,195,858
Patented July 20, 1965

3,195,858
SHAFT SEAL
Kurt Schwarz, Toronto, Ontario, Canada, assignor to Sulzer Freres, S.A., Winterthur, Switzerland, a corporation of Switzerland
Filed Dec. 5, 1963, Ser. No. 328,353
Claims priority, application Switzerland Nov. 1, 1963, 13,530/60
6 Claims. (Cl. 253—39)

The present application is a continuation-in-part application of my applications Serial No. 135,634 and Serial No. 135,681 now abandoned, both filed September 1, 1961.

The present invention relates to a liquid seal for a shaft of a turbomachine operating with a compressible operating medium and being in a vertical position. The turbomachine includes a shaft bearing lubricated by a liquid lubricant which is conducted in a circuit including a storage vessel for the lubricant. The lubricant serves also as a sealing liquid for the shaft seal.

It is an object of my invention to provide in combination with a turbomachine of the aforedescribed type a bearing and shaft seal arrangement which prevents uncontrolled leakage of the compressible operating medium of the turbomachine alongside the shaft to the outside and loss of operating medium and which also prevents seepage of lubricant, for example oil, from the bearing and/or from the shaft seal into the turbomachine. The arrangement according to the invention operates satisfactorily not only at variable pressure of the operating medium of the turbomachine at the shaft of the machine, but also when the turbomachine is stopped and the pressure in the machine drops. The aforedescribed object is obtained by positively separating the pressure prevailing in the lubricating system, particularly in the storage vessel forming part thereof, from the pressure in the shaft seal so that the pressure in the lubricant circuit is independent of the pressure in the gas space of the turbomachine.

The arrangement according to the invention preferably comprises a pressure chamber communicating the gas space of the turbomachine by means of the clearance of a gland surrounding the shaft of the turbomachine. The pressure chamber also communicates, through an annular clearance surrounding the shaft of the turbomachine a discharge channel formed in a housing surrounding a bearing for the shaft of the turbomachine.

The discharge channel receives lubricant from a space surrounding the turbomachine shaft whereby the lubricant passes from said space through an annular throttling clearance into the discharge channel.

In a preferred embodiment of the invention the aforesaid space is formed by an annular groove provided in the bearing body at the side thereof facing the turbomachine. The pressure of the lubricant in said pressure space is higher than the pressure of the operating medium of the turbomachine at the shaft seal.

An annular oil catching shield surrounding the shaft is preferably provided adjacent to said throttling clearance for catching the lubricant seeping alongside the shaft toward said gland.

The discharge channel formed in the housing surrounding the bearing has a lower end connected by conduit means to the storage vessel. Said conduit means include a volumetric dosing device which positively separates the pressure in the discharge channel from that in the storage vessel and controls the volume of medium passing per time unit from the discharge channel to the storage vessel. This device is so designed and arranged that the volume of the medium passed therethrough is greater than the volume of the lubricant passing through the throttling clearance to the discharge channel which volume depends on the difference between the pressure upstream of said clearance and the pressure in the discharge channel and on the size of said annular clearance. The excess of capacity of the dosing device over the volume of the lubricant is taken up by gas flowing from the turbomachine into the discharge channel. This excess capacity can be accurately predetermined.

In order to adjust the volume of gas passed by the volume control or dosing device, the volume of lubricant or sealing liquid entering the dosing device can be adjusted by allowing lubricant or sealing liquid to flow from the conduit supplying the liquid to the pressure space through a valved pipe into the inlet of the dosing device. The volume of gas passed by the dosing device is the difference between the capacity of the dosing device and the volume of liquid passed by the dosing device.

The novel features which are considered characteristic of the invention are set forth with particularity in the appended claims. The invention itself, however, and additional objects and advantages thereof will best be understood from the following description of embodiments thereof when read in connection with the accompanying drawing wherein:

Figure 1:
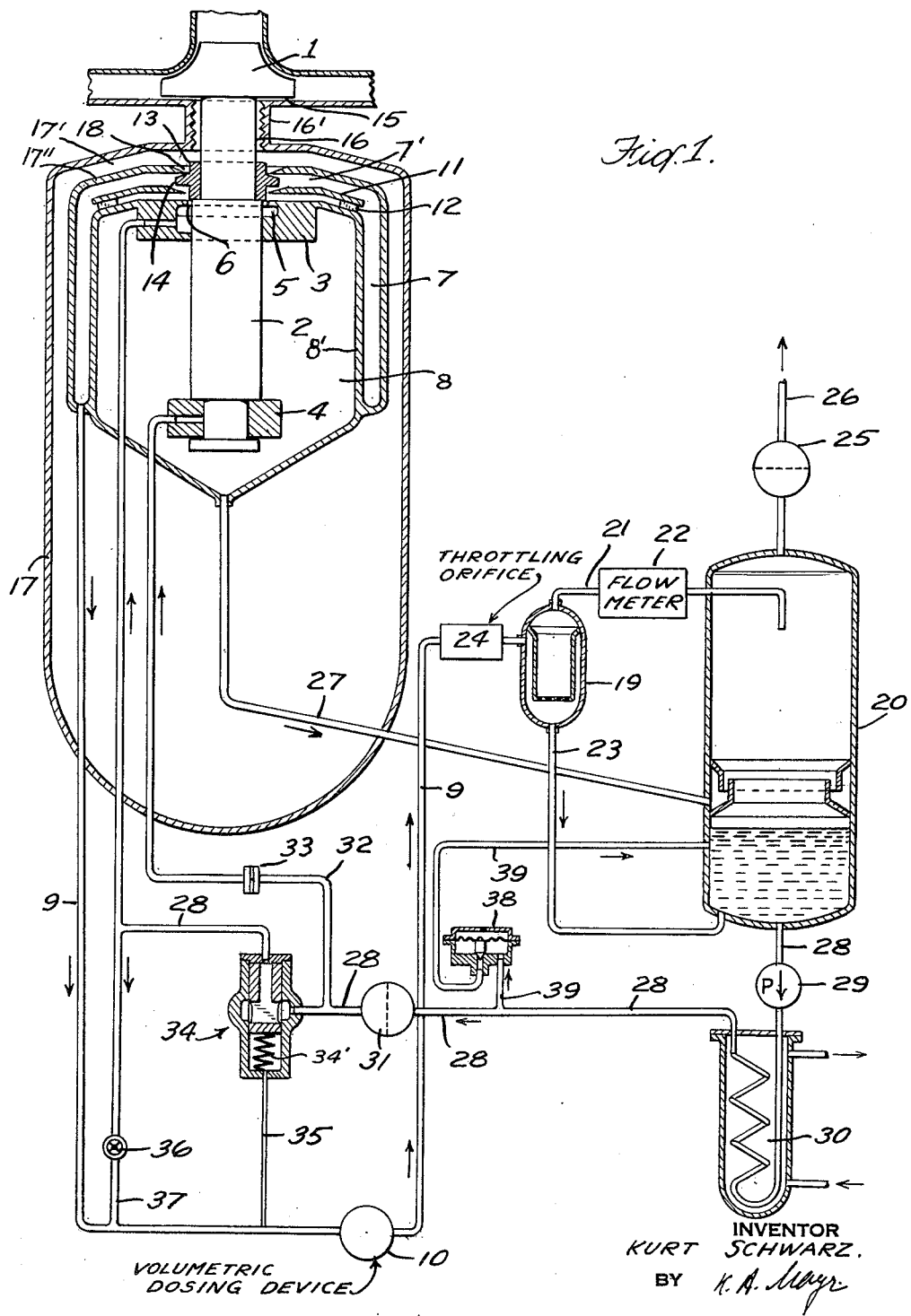
FIG. 1 is a diagrammatic part-sectional illustration of a turbomachine shaft seal system according to the invention.

Referring more particularly to FIG. 1 of the drawing, numeral 1 designates an expansion turbine having a vertical shaft 2 running in two oil-lubricated bearings 3 and 4. The bearing 3 is provided with an annular groove 5 adjacent to the shaft 2 for receiving lubricating oil under pressure. The groove 5 forms a pressure chamber which communicates an annular space 7' forming the upper part of a discharge channel 7 through an annular clearance 6. The channel 7 is formed in a part of a bearing housing 8' surrounding the shaft 2. A discharge pipe 9 connects the lower end of the discharge channel 7 to a gas separator 19 connected to a storage vessel 20 which will be described later. A volumetric dosing device 10 is interposed in the pipe 9 for controlling the volume of a gas-oil mixture flowing therethrough per time unit. The device 10 may be in the form of a volumetric displacement pump, for example a plunger pump, whose output depends on the operating speed and can be accurately predetermined and does not depend on the pressure of the pumped medium.

An annular shield 11 is placed in the annular space 7' and has an annular rim adjacent to the annular clearance 6 for catching oil leaving the pressure space 5 through the clearance 6. In the illustrated example the shield 11 is connected to the inner wall of the discharge channel 7 by means of webs 12.

An annular collar 13 is provided on the shaft 2 at the elevation of the annular space 7'. The collar 13 is preferably provided with a splash ring 14 for throwing lubricant from the collar 13 into the annular space 7'.

A gas storage pressure chamber 17 communicates the gas space 15 of the expansion turbine 1 through an annular clearance 16 of a gland 16' known as labyrinth packing. The chamber 17 has a portion 17' surrounding the bearings 3 and 4 and having an inner wall forming the outer wall of the channel 7. The aforesaid portion of the chamber 17 is connected to the annular space 7' through an annular passage 18 formed between the collar 13 and an annular edge of the upper wall 17" confining the space 7'. The top of the gas storage chamber 17 has an annular opening surrounding the shaft 2 between the gas sealing means 16' and the annular space 7'. Although there is no liquid in the chamber 17 when the system operates correctly, a drain cock may be provided for draining liquid when the system has been incorrectly operated.

The portion of the pipe 9 downstream of the device 10 is connected to the gas space of a centrifugal separator 19. The gas separated in the separator 19 is conducted through a conduit 21 into the gas space of the storage vessel 20. A flowmeter 22 is arranged in the conduit 21 for measuring the volume of gas flowing therethrough per time unit. The liquid space of the separator 19 is connected by means of a conduit 23 to the liquid space of the vessel 20. Upstream of the separator 19 a nozzle or throttling orifice 24 is interposed in the pipe 9 for reducing the pressure of the medium flowing through the pipe 9 and increasing the flow velocity of the medium to obtain the desired separation in the separator 19. A pipe 26 connected to the top of the vessel 20 and provided with an adsorption filter 25 is connected to a part of a circuit through which the operating medium of the turbomachine flows at a suitably low pressure as will be described in reference to FIG. 3. The separator 19 prevents presence of oil vapor in the gas space of the vessel 20 and loss of oil. It also prevents entry of gas into the liquid space of the vessel 20 and foaming therein.

The pressure in a cavity 8 of the housing 8' of the bearings 3 and 4 is substantially equal to the pressure in the storage vessel 20, the latter being connected to the cavity 8 by means of a lubricant return conduit 27.

Lubricant is fed from the liquid space in the vessel 20 through a pipe 28 containing a pump 29, a cooler 30 and a filter 31 to the bearing 3. A pipe 32 is connected to the pipe 28 downstream of the filter 31 for supplying lubricant to the bearing 4. A throttling orifice 33 is provided in the pipe 32 for controlling the relative pressures of the lubricant in the bearings 3 and 4. Downstream of the connection of the pipe 32 to the pipe 28 a device 34 is provided for maintaining a predetermined difference between the pressure in the pressure chamber 5 and the pressure at the gas side of the shaft seal. In the illustrated example the device 34 is in the form of a flow control means or valve actuated at one side by the pressure of a spring 34' plus the pressure in the pipe 9 to which the valve is connected by a pressure pulse conducting pipe 35. At the opposite side of the valve acts the pressure in the conduit 28. The valve 34 is opened when the pressure in the pipe 9 increases relative to the pressure in the pipe 28 and conversely, and maintains a predetermined difference between the pressures in the pipes 9 and 28, the difference being determined by the spring 34'.

In order to adjust the relative volumes of lubricant liquid and gas passed by the device 10 a pipe 37 connects the pipe 28 and the pipe 9 and is provided with a regulating valve 36.

In order to maintain a predetermined pressure of the lubricant oil passed through the pipe 28 downstream of the cooler 30 a pipe 39 containing a constant pressure inlet or relief valve 38 is connected to the pipe 28 between the cooler 30 and the filter 31 and to the liquid space of the vessel 20 for returning lubricant oil to the vessel 20 when the pressure in the pipe 28 exceeds a predetermined value.

The aforedescribed system operates as follows:

Oil is pumped by the pump 29 from the liquid space in the vessel 20 wherein there is a pressure of, for example, 14 p.s.i., to the bearings 3 and 4 at a pressure which exceeds the pressure at the gas side of the shaft seal. The pressure of the oil in the bearings 3 and 4 and therefore also in the chamber 5 may be, for example, 170 p.s.i. whereas the pressure in the gas space 15 of the expansion turbine amounts, for example, to 140 p.s.i. The pressure in the cavity 8 is equal to the pressure in the storage vessel 20 since said cavity is connected to the interior of the vessel 20 by the lubricant oil return conduit 27. The storage vessel 20 is arranged at a lower level than the cavity 8 so that gravity causes flow of lubricant to the vessel 20.

In order to make sure that the pressure in the chamber 5 exceeds the pressure at the gas side of the shaft seal by a predetermined constant pressure, i.e., that the difference between the pressure in the chamber 5 and the pressure at the gas side of the shaft seal remains constant also during variations of the gas pressure in the turbomachine, the regulator 34 is provided. The regulator 34 controls the supply of lubricant oil to the bearing 3 in response to the difference between the pressure in the discharge channel 7 and the pressure in the space 5. The pressure in the discharge channel and in the gas storage chamber 17 is substantially equal to the pressure in the gas space 15 of the turbomachine which in the example described herein amounts to about 140 p.s.i.

The device 10 provided in the pipe 9 connected to the discharge channel 7 separates the pressure in the gas space of the turbomachine and in the vessel 17 from the pressure in the vessel 20 and in the cavity 8. In the described example the pressure in the pipe 9 is about 140 p.s.i. and in the vessel 20 about 14 p.s.i. The device 10 makes it impossible that pressure variations in the gas space of the turbomachine influence in any way the pressure in the vessel 20 so that it is made impossible that oil from the vessel 20 is drawn into the gas space of the turbomachine upon a sudden drop of the pressure in the latter. The volume of oil flowing from the annular chamber 5 through the annular clearance 6 into the discharge channel 7 is determined by the difference of the pressure in the chamber 5 and in the channel 7 and the size of the annular clearance 6. According to the invention, in addition to the aforementioned volume of oil, a predetermined volume of gas must be conducted from the gas space of the turbomachine through the gland 16' so that no oil will flow alongside the turbine shaft 2 into the turbomachine. To obtain this result the volumetric capacity of the device 10 is greater than the volume of the lubricating oil leaving the chamber 5 through the annular clearance 6 so that a predetermined volume of gas enters the channel 7 through the clearance or passage 18.

This gas is separated in the separator 19 from the oil-gas mixture passing through the device 10. If, for example, 20 cubic feet of oil pass per hour through the clearance 6, the volumetric throughput capacity of the device 10 must amount to 30 cubic feet per hour so that not only the 20 cubic feet of lubricant oil but also 10 cubic feet of gas which is taken from the gas space of the turbomachine are passed through the device 10 and the separator 19.

In the illustrated example a pipe 37 provided with a valve 36 connects the pipe 28 upstream of the device 10 to the pipe 9. With this arrangement the composition of the oil-gas mixture entering the device 10 can be controlled. Opening of the valve 36 causes an increase of the amount of oil in the mixture, and, since the capacity of the device 10 remains unchanged, a reduction of the gas volume flowing out of the turbomachine.

Most of the oil flowing from the chamber 5 into the discharge channel 7 is diverted by the stationary shield 11 and is not mixed with the gas flowing in the channel 7 until the flow velocity of the oil is considerably reduced. In this way foaming is prevented and the oil and gas flow through the vertical portion of the channel 7 without objectionable intermixing. Without the provision of the shield 11 the oil leaving the annular clearance 6 would be sprayed into the space 7' because of the high rotational speed of the shaft 2. This spraying would cause objectionable intermixing of the oil and the gas entering through the passage 18. The foam resulting from this intermixing would excessively increase the volume of the oil-gas mixture and the channel 7 would be filled with oil foam which could not be satisfactorily passed by the device 10. The vertical arrangement of the shaft of the turbomachine and the skirt-like arrangement of the channel 7 which has a substantial, vertical portion considerably facilitate removal of the oil and gas mixture.

The spray ring 14 on the collar 13 prevents entry of the oil through the clearance 18 into the gas storage chamber 17 and makes sure that the oil flows between the shield 11 and the shaft 2 into the space 7' and the discharge channel 7.

The effect of the gas storage chamber 17 is important when stopping the turbomachine or at a great pressure drop of the gas flowing through the turbomachine during operation thereof. When the turbomachine is in operation the pressure in the gas space 15 is substantially equal to the pressure in the chamber 17. The labyrinth packing 16 has little influence on the pressure in the chamber 17 since, during operation of the turbomachine, only a small volume of gas passes through the packing at low velocity which does not cause any appreciable pressure drop.

At a sudden drop of the pressure of the gas in the turbomachine, for example when the machine is stopped, the pressure of the gas in the chamber 17 which does not contain oil and is dry, drops very slowly because of the great volume of the chamber 17 compared with the volume of the discharge channel 7. The pressure in the chamber 17 drops much slower than the pressure in the discharge channel 7 which is determined by the device 10. The gas expands from the chamber 17 into the discharge channel 7 so that passage of oil from the space 7' alongside the shaft 2 into the gas space of the turbomachine is positively prevented.

Figure 2:
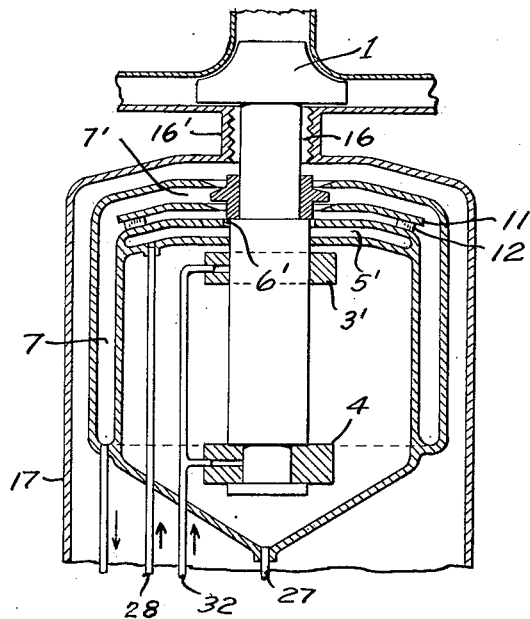
FIG. 2 is a diagrammatic sectional view of a modified part of the system shown in FIG. 1.

In the embodiment of the invention shown in FIG. 2 the chamber 5' is not in the body of the bearing 3' corresponding to bearing 3 in FIG. 1, but is separated therefrom. The clearance designated by numeral 6' corresponds to the clearance 6 in the arrangement according to FIG. 1.

Figure 3:
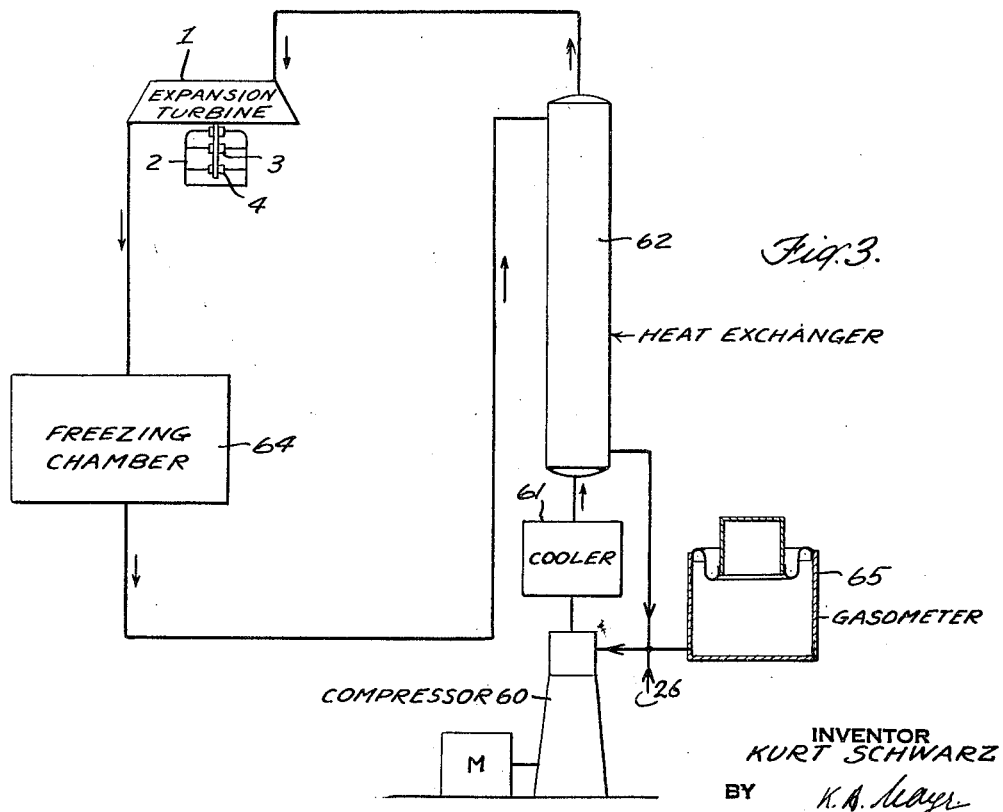
FIG. 3 is a diagram showing the system according to the invention in combination with an expansion turbine forming part of a compression refrigerating plant.

FIG. 3 shows a compression refrigerating plant including a compressor 60 pumping gas consecutively through a cooler 61, a heat exchanger 62, an expansion turbine 1, and a freezing chamber 64, for example a shrinking chamber, a test room for scientific purposes, or the like. The pipe 26 shown in FIG. 1 is connected to the inlet of the compressor 60 so that the gas escaping through the shaft seal according to the invention is not lost but is returned to the gas circuit. If the refrigerating plant is provided with a gasometer 65, shown in FIG. 3, the pipe 26 is connected to the pipe connecting the gasometer and the inlet of the compressor 60.

In the described example the shaft seal according to the invention is applied to the shaft of an expansion turbine. Without departing from the scope of the present invention the shaft seal can also be used in combination with turbocompressors.

I claim:

1. In combination with a turbomachine for a gaseous operating medium and having a casing, a rotor in said casing, a shaft connected to said rotor and extending outside of said casing, a bearing for said shaft outside of said casing, a housing for said bearing, and gas sealing means surrounding said shaft between said casing and said housing:
   an annular chamber formed in said housing adjacent to said bearing and surrounding said shaft,
   a lubricant storage vessel,
   first conduit means connecting said vessel and said annular chamber for supplying a liquid lubricant to said annular chamber at a predetermined pressure exceeding the pressure of the gaseous operating medium of said turbomachine at the side of said gas sealing means facing said housing,
   said housing having a portion forming an annular space surrounding said shaft adjacent to said annular chamber and continuing into a discharge channel,
   said housing having a portion providing an annular clearance around said shaft between said annular chamber and said annular space for permitting throttled flow of lubricant from said annular chamber into said annular space,
   said housing having a portion forming an annular passage around said shaft between said gas sealing means and said annular space for permitting flow of gas from said gas sealing means into said annular space,
   a discharge pipe connected to said discharge channel,
   second conduit means interconnecting said discharge pipe and said vessel,
   a volumetric dosing device interposed in said second conduit means and pressurewisely separating said vessel from said discharge pipe, the throughput capacity of said dosing device being greater than the rate of flow of the lubricant through said annular clearance at said predetermined pressure, the excess capacity permitting flow of a predetermined volume of gas from said turbomachine through said gas sealing means, and
   a flow control means interposed in said first conduit means,
   said flow control means including means responsive to the difference between the pressure in said first conduit means and the pressure in said second conduit means for opening said flow control means upon an increase of said difference and conversely.

2. A sealing arrangement for a vertical turbomachine for a compressible operating medium, said turbomachine including a vertical shaft, a casing provided with sealing means through which said shaft extends, and a bearing for said shaft axially spaced from an outside of said sealing means, said sealing arrangement comprising:
   a closed gas storage chamber having a portion surrounding said shaft adjacent said sealing means and communicating through said sealing means with the inside of said casing,
   said bearing having a pressure chamber, and a clearance adjacent said shaft opposite said sealing means and communicating with said pressure chamber,
   means for supplying a liquid lubricant to said pressure chamber at a predetermined pressure,
   a lubricant discharge channel having an annular inlet portion surrounding said shaft between said bearing and said portion of said gas storage chamber for receiving lubricant from said clearance,
   stationary lubricant-catching means surrounding said shaft inside said annular inlet portion of said lubricant discharge channel for catching lubricant escaping through said clearance and directing the lubricant into said discharge channel,
   said annular inlet portion communicating with said portion of said gas storage chamber,
   said lubricant discharge channel having a lower portion,
   a lubricant storage vessel having gas outlet means for maintaining a pressure in said storage vessel which pressure is lower than the pressure in said discharge channel,
   a lubricant discharge conduit connecting said lower portion of said discharge channel to said storage vessel, and
   a volumetric dosing device interposed in said discharge conduit for pressurewisely separating said vessel from said discharge channel, the throughput capacity of said dosing device being greater than the rate of flow of the lubricant through said clarance at said predetermined pressure, the excess capacity of said dosing device affording flow of a predetermined volume of gas from said turbomachine through said sealing means and through said discharge channel in addition to the liquid lubricant flowing through said discharge channel.

3. A sealing arrangement as defined in claim 2 wherein said clearance and said pressure chamber are annular and said pressure chamber forms a groove in said bearing.

4. A sealing arangement as defined in claim 2 including a housing for said bearing, a cavity in said housing surrounding said bearing for collecting lubricant leaking from said bearing, said cavity being placed at an elevation higher than said lubricant storage vessel, and a conduit connecting said cavity to said storage vessel for conducting lubricant collected in said cavity by gravity into said storage vessel.

5. A sealing arrangement for a vertical turbomachine for a compressible operating medium, said turbomachine including a vertical shaft, a casing provided with sealing means through which said shaft extends, and a bearing for said shaft axially spaced from and outside of said sealing means, said sealing arrangement comprising:

a closed gas storage chamber having a portion surrounding said shaft adjacent said sealing means and communicating through said sealing means with the inside of said casing, said bearing having a pressure chamber, and a clearance adjacent said shaft opposite said sealing means and communicating with said pressure chamber, means for supplying a liquid lubricant to said pressure chamber at a predetermined pressure, a lubricant discharge channel having an annular inlet portion surrounding said shaft between said bearing and said portion of said gas storage chamber for receiving lubricant from said clearance, said annular inlet portion communicating with said portion of said gas storage chamber, said lubricant discharge channel having a lower portion, a lubricant storage vessel having gas outlet means for maintaining a pressure in said storage vessel which pressure is lower than the pressure in said discharge channel, a lubricant discharge conduit connecting said lower portion of said discharge channel to said storage vessel, a volumetric dosing device interposed in said discharge conduit for pressurewisely separating said vessel from said discharge channel, the throughput capacity of said dosing device being greater than the rate of flow of the lubricant through said clearance at said predetermined pressure, the excess capacity of said dosing device affording flow of a predetermined volume of gas from said turbomachine through said sealing means and through said discharge channel in addition to the liquid lubricant flowing through said discharge channel, a pipe interconnecting said means for supplying lubricant to said pressure chamber and said discharge conduit upstream of said dosing device, and a valve in said pipe for by-passing a controlled amount of lubricant around said pressure chamber, said clearance and said discharge channel for varying the relative amounts of lubricant and gas passing through said dosing device.

6. A sealing arrangement for a vertical turbomachine for a compressible operating medium, said turbomachine including a vertical shaft, a casing provided with sealing means through which said shaft extends, and a bearing for said shaft axially spaced from and outside of said sealing means, said sealing arrangement comprising:

a closed gas storage chamber having a portion surrounding said shaft adjacent said sealing means and communicating through said sealing means with the inside of said casing, said bearing having a pressure chamber, and a clearance adjacent said shaft opposite said sealing means and communicating with said pressure chamber, means for supplying a liquid lubricant to said pressure chamber at a predetermined pressure, a lubricant discharge channel having an annular inlet portion surrounding said shaft between said bearing and said portion of said gas storage chamber for receiving lubricant from said clearance, said annular inlet portion communicating with said portion of said gas storage chamber, said lubricant discharge channel having a lower portion, a lubricant storage vessel having gas outlet means for maintaining a pressure in said storage vessel which pressure is lower than the pressure in said discharge channel, a lubricant discharge conduit connecting said lower portion of said discharge channel to said storage vessel, a volumetric dosing device interposed in said discharge conduit for pressurewisely separating said vessel from said discharge channel, the throughput capacity of said dosing device being greater than the rate of flow of the lubricant through said clearance at said predetermined pressure, the excess capacity of said dosing device affording flow of a predetermined volume of gas from said turbomachine through said sealing means and through said discharge channel in addition to the liquid lubricant flowing through said discharge channel, and a centrifugal separator connected to said discharge conduit downstream of said dosing device for separating gas from the lubricant, said storage vessel having a gas space connected to the gas space in said separator and having a liquid space connected to the liquid space of said separator.

References Cited by the Examiner
UNITED STATES PATENTS

| | | | |
|---|---|---|---|
| 1,600,149 | 9/26 | Surjaninoff | 253—39 |
| 2,155,218 | 4/39 | Cain | 253—39 |
| 2,234,777 | 3/41 | Puffer | 253—39 |
| 2,501,304 | 3/50 | Baudry et al. | 253—39 |
| 2,660,367 | 11/53 | Ehlinger | 253—39 |
| 2,820,652 | 1/58 | Oechslin | 253—39 |
| 2,910,328 | 10/59 | Frolich | 253—39 |
| 2,965,398 | 12/60 | Keller et al. | 253—39 |

JOSEPH H. BRANSON, Jr., Primary Examiner.

HENRY F. RADUAZO, Examiner.